US010267367B2

(12) United States Patent
Le Ru

(10) Patent No.: US 10,267,367 B2
(45) Date of Patent: Apr. 23, 2019

(54) FLEXIBLE COUPLING MEANS, A MECHANICAL TRANSMISSION, AND AN AIRCRAFT

(71) Applicant: AIRBUS HELICOPTERS, Marignane (FR)

(72) Inventor: John Le Ru, Tauxigny (FR)

(73) Assignee: AIRBUS HELICOPTERS, Marignane (FR)

( * ) Notice: Subject to any disclaimer, the term of this patent is extended or adjusted under 35 U.S.C. 154(b) by 328 days.

(21) Appl. No.: 15/227,158

(22) Filed: Aug. 3, 2016

(65) Prior Publication Data
US 2017/0037911 A1 Feb. 9, 2017

(30) Foreign Application Priority Data

Aug. 7, 2015 (FR) ...................................... 15 01691

(51) Int. Cl.
| | |
|---|---|
| *F16D 3/18* | (2006.01) |
| *F16D 3/72* | (2006.01) |
| *F16D 9/10* | (2006.01) |
| *F16D 11/16* | (2006.01) |
| *F16D 11/00* | (2006.01) |

(52) U.S. Cl.
CPC ............... *F16D 3/72* (2013.01); *F16D 3/185* (2013.01); *F16D 9/10* (2013.01); *F16D 11/16* (2013.01); *F16D 2011/006* (2013.01); *Y10T 403/7005* (2015.01)

(58) Field of Classification Search
CPC ... F16D 3/185; F16D 3/72; F16D 3/74; F16D 3/76; F16D 3/77; F16D 3/78; F16D 3/79; F16D 9/06; F16D 9/08; F16D 9/10; Y10T 403/7005

USPC ........... 464/32, 79, 80, 98, 99, 158; 403/348
See application file for complete search history.

(56) References Cited

U.S. PATENT DOCUMENTS

| | | | | |
|---|---|---|---|---|
| 4,133,188 A | * | 1/1979 | Cartwright | ................ F16D 3/72 |
| | | | | 464/158 |
| 4,265,099 A | * | 5/1981 | Johnson | .................... F16D 3/72 |
| | | | | 464/79 |
| 4,276,758 A | * | 7/1981 | Coman | ................... F16D 3/185 |
| | | | | 464/158 |

(Continued)

FOREIGN PATENT DOCUMENTS

| | | |
|---|---|---|
| FR | 2449231 | 9/1980 |
| FR | 1426477 | 1/1996 |

(Continued)

OTHER PUBLICATIONS

French Search Report for French Application No. FR 1501691, Completed by the French Patent Office on Jun. 20, 2016, 6 Pages.

*Primary Examiner* — Josh Skroupa
(74) *Attorney, Agent, or Firm* — Brooks Kushman P.C.

(57) ABSTRACT

A coupling means having a first member provided with a first diaphragm and a second member provided with a second diaphragm. The coupling means include an additional device having a plurality of protrusions circumferentially distributed on a first cylinder of the first member and a plurality of abutments distributed circumferentially on a second cylinder of the second member, each protrusion presenting at least one sliding face facing a first bearing face of an abutment, each protrusion presenting a blocking face facing a face of the second member referred to as a "second bearing" face.

19 Claims, 5 Drawing Sheets

(56) References Cited

U.S. PATENT DOCUMENTS

| | | | | |
|---|---|---|---|---|
| 4,560,364 A | * | 12/1985 | Cohen | F16D 3/72 |
| | | | | 464/99 |
| 5,407,386 A | * | 4/1995 | Kish | B64C 27/12 |
| | | | | 464/99 |
| 5,588,917 A | | 12/1996 | D'Ercole | |
| 8,986,127 B2 | | 3/2015 | Berthalon | |

FOREIGN PATENT DOCUMENTS

| | | |
|---|---|---|
| FR | 2990011 | 11/2013 |
| GB | 2043207 | 10/1980 |
| JP | H0253527 | 4/1990 |

\* cited by examiner

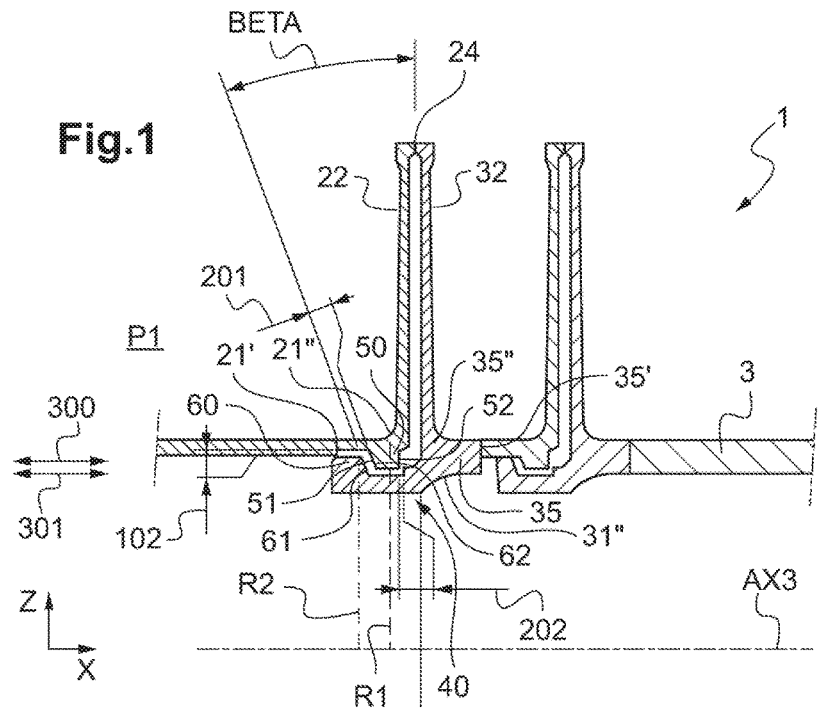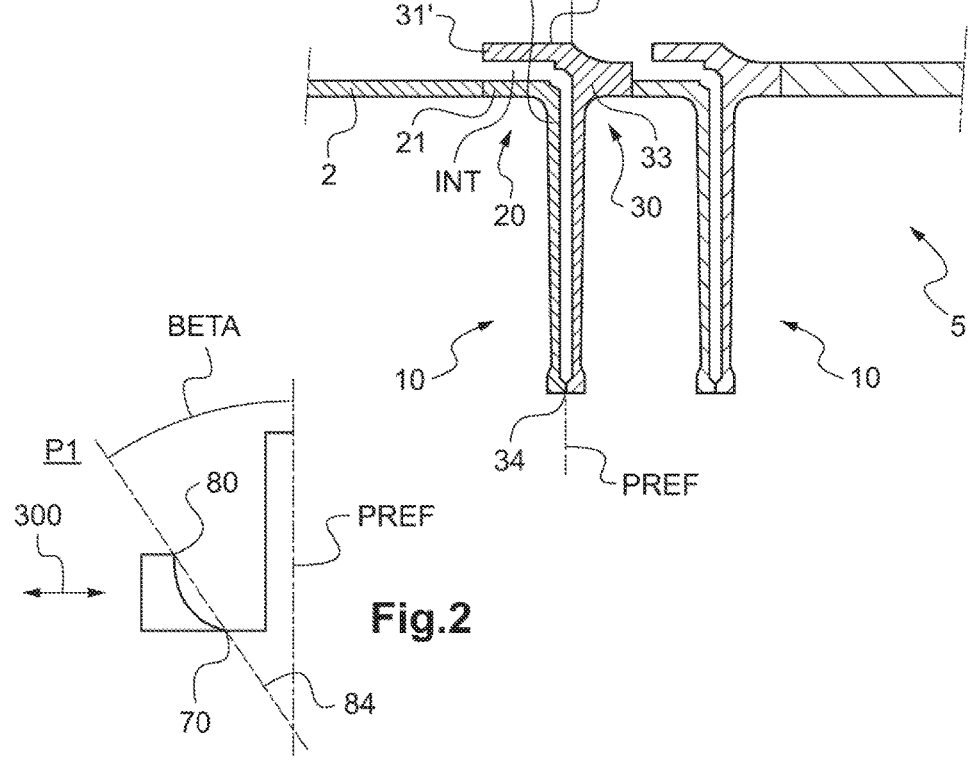

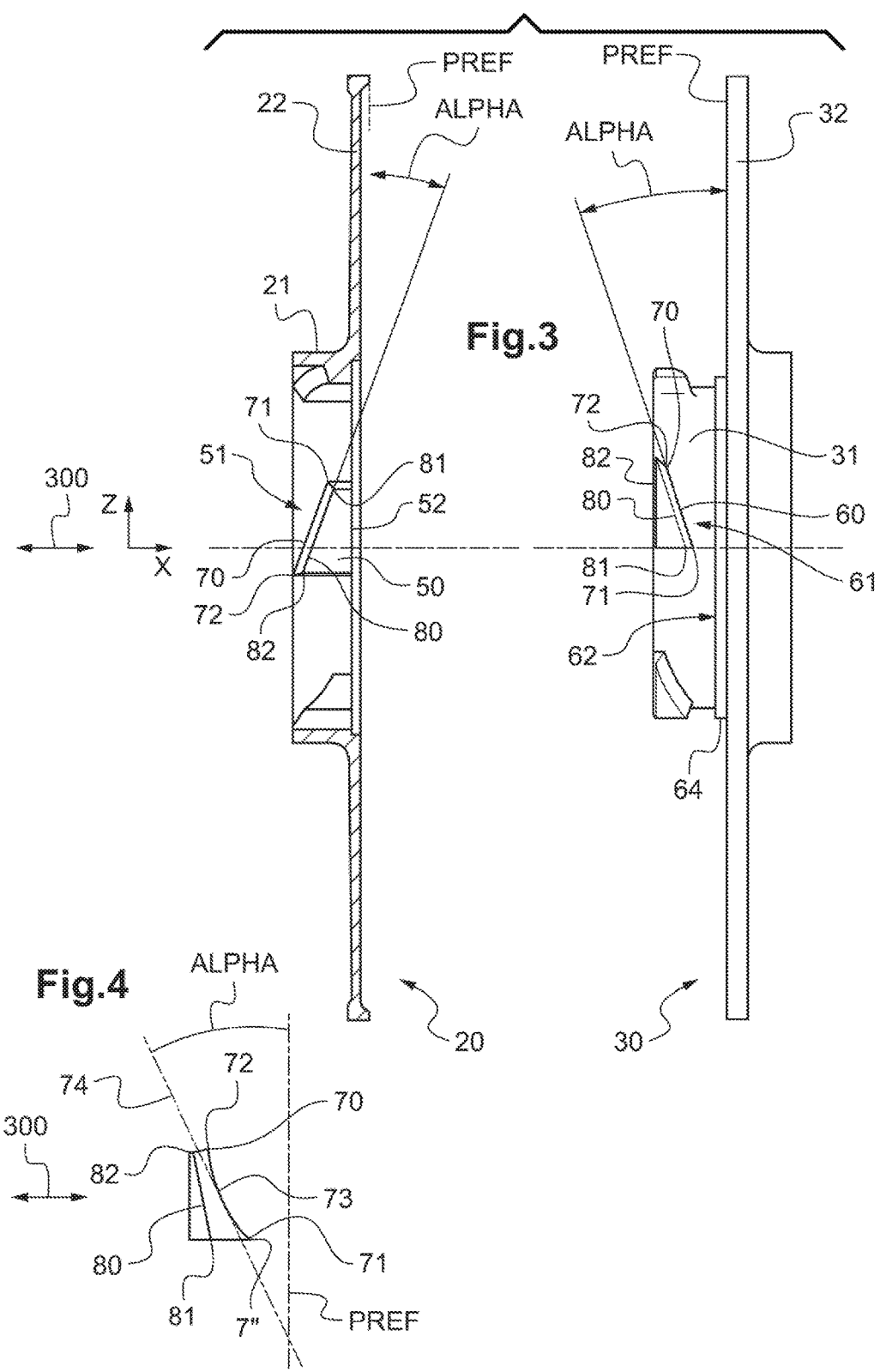

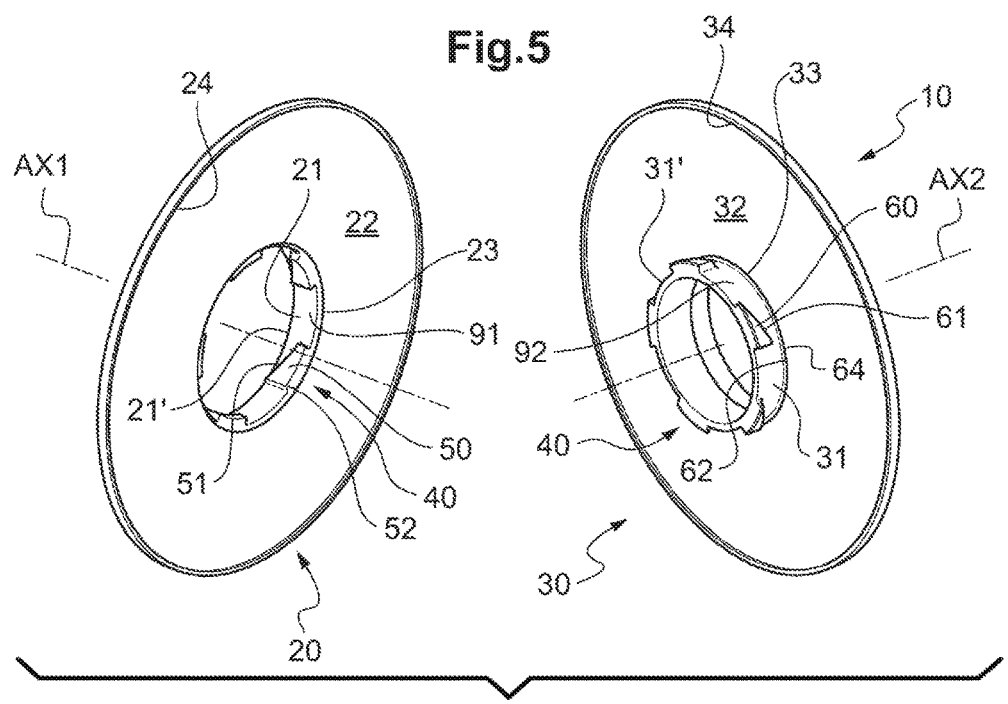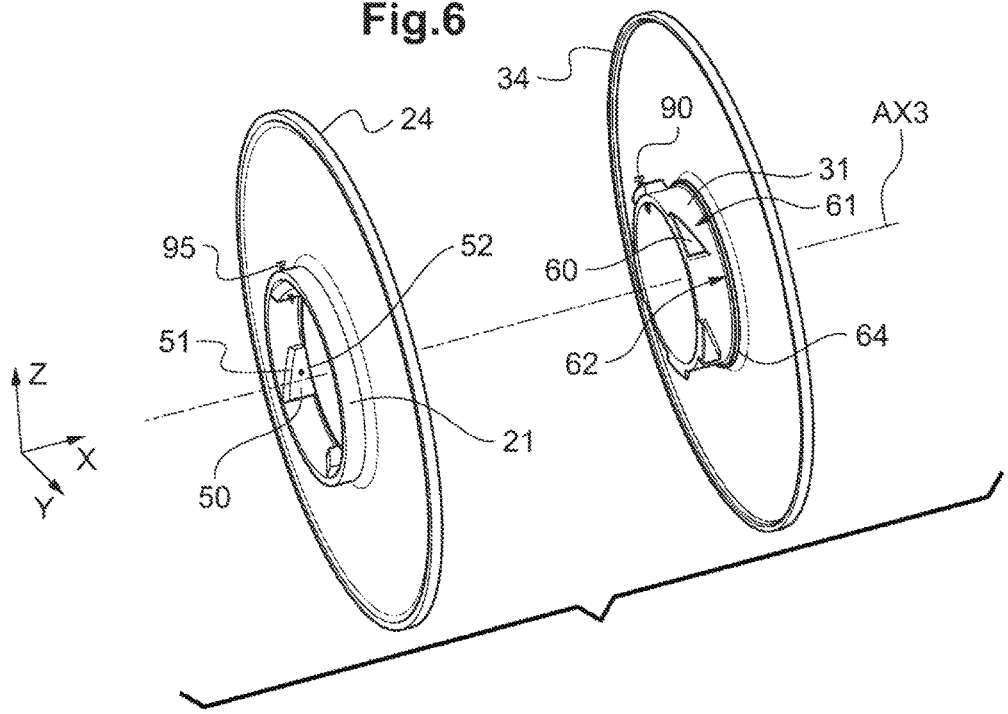

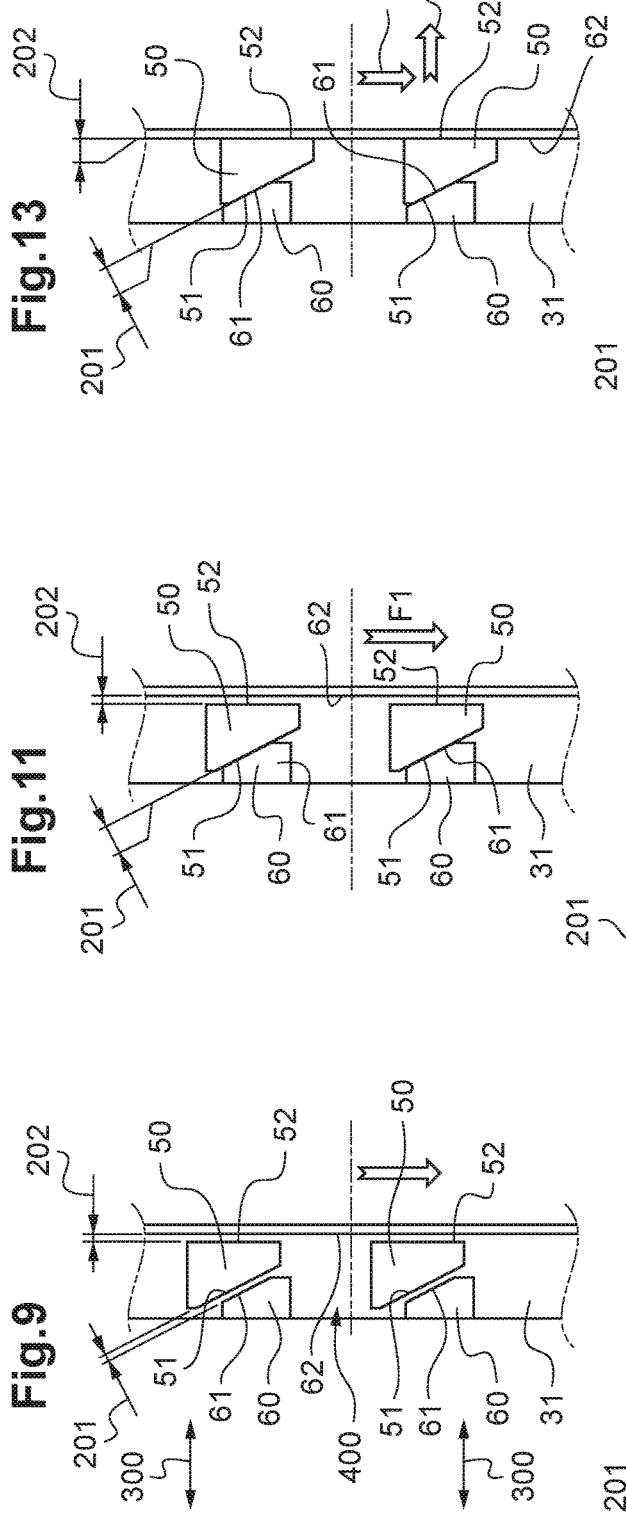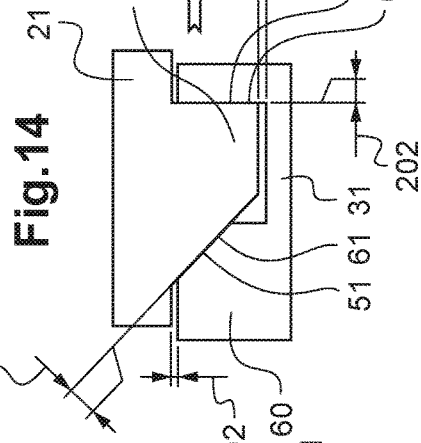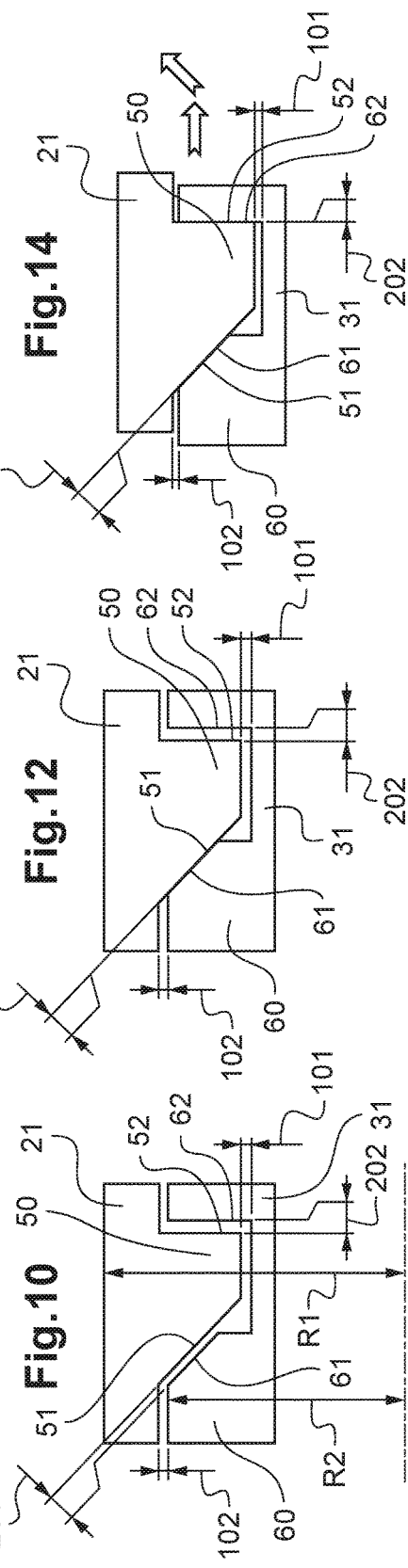

FLEXIBLE COUPLING MEANS, A MECHANICAL TRANSMISSION, AND AN AIRCRAFT

CROSS-REFERENCE TO RELATED APPLICATIONS

This application claims priority to French patent application No. FR 15 01691 filed on Aug. 7, 2015, the disclosure of which is incorporated in its entirety by reference herein.

BACKGROUND OF THE INVENTION (1) Field of the Invention

The present invention relates to flexible coupling means that can tolerate angular and axial shifts while connecting together two rotary mechanical units. The coupling means may for example connect a power transmission shaft to a part or a mechanical assembly such as a turboshaft engine of a rotorcraft. The invention also relates to a mechanical transmission provided with the flexible coupling means, and to an aircraft.

Consequently, the invention lies in the technical field of transmitting power from one mechanical unit to another mechanical unit, and in particular mechanical units of a rotorcraft.

(2) Description of Related Art

In particular, most presently-constructed rotorcrafts have at least one turboshaft engine with a free turbine. Power is then taken from a low pressure stage of the free turbine, which stage is mechanically independent of the compressor assembly and of the high pressure stage of the engine. The free turbine of a turboshaft engine has a speed of rotation that generally lies in the range 20,000 revolutions per minute (rpm) to 50,000 rpm, so it is necessary for a speed-reducing gearbox to be provided in order to connect with the main rotor of the rotorcraft, since its speed of rotation generally lies in the range 200 rpm to 400 rpm: this power transmission gearbox is commonly referred to as the main gearbox (MGB).

Under such conditions, the engine is connected to the main gearbox of the rotorcraft via at least one transmission shaft rotating about its axis of rotation at a speed that is often greater than 5000 rpm.

Likewise, a rotorcraft may include a tail rotor driven by at least one power transmission shaft for controlling yaw movement of the rotorcraft. The speed of rotation of the tail rotor is likewise less than the speed of rotation of the free turbine.

In addition, it should be recalled that the power transmitted by an element rotating about an axis is equal to the product of the speed of rotation of that element multiplied by the mechanical torque applied to said element.

In general manner, a power transmission shaft needs to be securely fastened by coupling means to the mechanical units that are to be set into rotation. Such a power transmission shaft is referred to below as a "transmission shaft", for short.

Furthermore, the coupling means must enable the transmission shaft to transfer the power developed by one mechanical unit to another mechanical unit under conditions that are extreme, i.e. when the interconnected members are not properly aligned with each other.

Means for coupling a transmission shaft to a mechanical unit then need to be dimensioned to accommodate axial and angular misalignment between the transmission shaft and the mechanical unit.

Known mechanical coupling means accommodating such misalignments are provided with a first annular member and with a second annular member.

Each annular member has a thin flexible annular disk extending radially from a base to an outer periphery. The base is secured to means for fastening to a rotary unit, such as a transmission shaft.

Each annular disk is sometimes referred to as a "diaphragm". The term "diaphragm" is therefore used below for reasons of convenience.

Under such circumstances, the two annular members are connected together solely via the outer peripheries of the diaphragms. The outer peripheries may be fastened together by welding, or indeed using nuts blocked by bolts, for example.

Diaphragm coupling means provide an advantageous solution for interconnecting rotary units that might be out of alignment.

Such diaphragm coupling means possess a relatively high level of reliability because of the small number of parts. Nevertheless, diaphragm coupling means with thin diaphragms can lead to a degree of weakness on going beyond the nominal axial and angular misalignments that were taken into account when they were designed.

Document U.S. Pat. No. 5,588,917 describes connection means having two torque transmission paths, one of the paths including fluting.

Document FR 2 990 011 describes coupling means having a first member suitable for being fastened to a first rotary unit and a second member suitable for being fastened to a second rotary unit. The first member has a first diaphragm, the second member being provided with a second diaphragm secured to the first diaphragm. An emergency torque transmission device has at least one bayonet system including a protrusion secured to one of the members co-operating with an angled groove formed in the other member, and being inserted into the angled groove by a push-and-turn movement, the coupling means, in the absence of rupture, leaving axial clearance both in compression and in traction, and circumferential clearance between each protrusion and walls defining the corresponding angled groove.

Documents FR 2 449 231, U.S. Pat. No. 4,133,188, JP H02 53527 U, and FR 1 426 477 are also known.

BRIEF SUMMARY OF THE INVENTION

An object of the present invention is thus to propose flexible coupling means that accommodate axial and radial misalignments between two rotary units under normal conditions. The coupling means seek to minimize any risk of the transmission of torque between said rotary units being interrupted as a result of the rupture of a diaphragm or of the connection between the two diaphragms, while nevertheless being relatively simple in structure.

According to the invention, coupling means are provided with a first member suitable for being fastened to a first rotary unit and a second member suitable for being fastened to a second rotary unit, the first member being provided with a first diaphragm and the second member being provided with a second diaphragm. The second diaphragm is secured to the first diaphragm in order to allow shifting between the first rotary unit and the second member. The coupling means include an additional torque transmission device for at least connecting together the first and second members in the event of at least one of the diaphragms or of a connection between the diaphragms rupturing.

The shifting may be axial and/or angular and/or lateral shifting.

The diaphragms may be of known type. The outer periphery of the first diaphragm, referred to as the "first" outer periphery, is then secured to the outer periphery of the second diaphragm, referred to as the "second" outer periphery, by a fastener system. Such a fastener system may comprise welding or bolting means, for example.

Furthermore, the additional device has at least one plurality of protrusions distributed circumferentially on a first cylinder of the first member and a second plurality of abutments distributed circumferentially on a second cylinder of the second member, each protrusion presenting at least one face with two angles of inclination, referred to as a "sliding" face, facing a face with two angles of inclination of an abutment, referred to as a "first bearing" face, each protrusion presenting a face, referred to as a "blocking" face, facing a face of the second member, referred to as a "second bearing" face.

In the absence of rupture in at least one diaphragm or in the connection between the diaphragms, first radial clearance lies between each protrusion of the second member in a direction passing via a radius of the first cylinder and second radial clearance lies between each bearing face of the first member in a direction passing via a radius of the second cylinder. First axial clearance lies between each protrusion and a first bearing face, and second axial clearance lies between each blocking face and a second bearing face in an axial direction parallel to an axis of rotation of the first member and of the second member.

The axis of rotation represents the axis of rotation about which the first and second members rotate in the absence of misalignment. This axis of rotation then coincides with the axis of symmetry of each member in the absence of misalignment.

In addition, each face with two angles of inclination presents a first angle of inclination to enable a protrusion to be wedged between a first bearing face and a second bearing face by eliminating said axial clearances as a result of the protrusions turning relative to the bearing faces about said axis of rotation in the event of a said rupture, each face with two angles of inclination presenting a second angle of inclination for centering the first cylinder relative to the second cylinder following the relative turning.

In a variant, the blocking face and the second bearing face are faces having two angles of inclination.

The term "axial" refers to a direction parallel to the axis of rotation of the members and to an axis of symmetry of the members.

The term "radial" refers to a direction that is perpendicular to an axis of rotation of the members and to an axis of symmetry of the members. The term "radial" is used with reference to the annular shape of the diaphragms and of the cylinders.

Such coupling means thus include a main torque transmission device. The main device is provided with the two connected-together diaphragms.

In addition, the coupling means possess an additional torque transmission device. The additional device is provided with tangential buffers in the form of bearing faces and protrusions.

During a normal mode of operation, i.e. in the absence of rupture in the connection between the diaphragms, the coupling means enable torque to be transmitted via the diaphragms. Advantageously, it is the first member that drives the second member in rotation.

Furthermore, the diaphragms may deform locally so as to accommodate misalignments between the first and second members.

In addition, the additional device can protect the coupling by limiting such misalignments during the normal mode of operation.

The additional device can thus protect the coupling by mechanically limiting any relative turning between the first member and the second member. Following any such relative turning, each protrusion comes into contact against a first bearing face and a second bearing face, thereby limiting the relative turning between the first member and the second member.

Specifically, the sliding face of a protrusion is of a shape that co-operates by shape interference with a countershape represented by the first bearing face. Likewise, the blocking face of a protrusion represents a shape that co-operates by shape interference with a countershape represented by the second bearing face.

Likewise, the additional device can protect the coupling by mechanically limiting the axial distance between the first member and the second member.

The additional device can also protect the coupling by mechanically limiting the angular misalignment that is acceptable between the first member and the second member.

In particular, the value of axial clearance in one direction determines the maximum axial deformation that is acceptable in compression for the coupling means, and the value of axial clearance in the opposite direction corresponds to the maximum axial deformation that is acceptable by the coupling means in traction. These two axial clearance values also lead to specifying the maximum deformation that is acceptable during angular misalignment between the first and second members.

Consequently, the additional device presents radial and axial clearances that allow misalignments between the first and second members. Nevertheless, these radial and axial clearances are designed so that the additional device limits the allowable misalignment to within a given range, as a result of shape interference between the protrusions and the bearing faces.

Furthermore, the additional device is also useful in an emergency mode, with the emergency mode becoming operative as a result of a diaphragm rupturing or of the mechanical connection between the diaphragms rupturing.

On initiation of the emergency mode, the first member turns relative to the second member.

The first angle of inclination of each face having two angles of inclination leads to each protrusion moving axially relative to the corresponding bearing faces. As a result of this movement, each protrusion becomes wedged axially between a first bearing face and a second bearing face. Axial clearance in both directions is thus eliminated.

Under such circumstances, it becomes possible to transmit torque by wedging of shapes between the protrusion and a first bearing face and a second bearing face.

Furthermore, the second angle of inclination of the faces having two angles of inclination tends to cause each protrusion to move radially relative to the corresponding bearing faces. Nevertheless, each protrusion tends to move radially along its own radial direction. Under such circumstances, the protrusions tend to move radially along directions that are different and may well be opposite. This phenomenon thus tends to center the first member relative to the second member while maintaining radial clearances between the members.

Furthermore, the first angle of inclination and the second angle of inclination may be designed so as to lead to combined axial and radial movements in order to avoid creating a connection that is statically undetermined.

The connection made by the additional device, which can be considered as being a connection between shapes and countershapes that are conical, is then naturally self-locking.

The additional device thus makes it possible to ensure continuity in the transmission of rotary motion and torque in the event of mechanical rupture between the diaphragms.

Furthermore, the additional device thus enables the first member to be positioned radially relative to the second member.

This characteristic is found to be advantageous. Specifically, certain emergency devices present operating clearance. Such operating clearance can sometimes lead to unbalance that can degrade the operation of the coupling means.

Conversely, the coupling means of the invention propose an additional device having faces with two angles of inclination serving to eliminate axial clearance between the first member and the second member while blocking the first member radially relative to the second member. This absence of movement tends to avoid creating unbalance and tends to minimize wear on the mechanical parts in the absence of relative movement between the first and second members.

Such an architecture is not obvious in any way insofar as it is an architecture that tends to prevent misalignments between the first and second members. However the coupling means are initially provided specifically to accommodate such misalignments. Nevertheless, the Applicant has observed that a mechanical transmission usually includes a plurality of coupling means. Under such circumstances, it is possible to tolerate blocking in coupling means that have become defective.

Furthermore, the transition from the normal mode to the emergency mode may be progressive. Consequently, the protrusions do not necessarily need to be designed to be capable of withstanding high levels of impact as a result of going from the normal mode of operation to the emergency mode.

Specifically, the rupture of a diaphragm or of the connection between the diaphragms can take place progressively, without occurring suddenly.

For example, excess torque may lead to the diaphragms buckling progressively before rupture proper takes place. Such buckling causes the protrusions to move relative to the bearing faces. Under such circumstances, when rupture occurs, the protrusions have already moved relative to the bearing faces, thus leading to a transition between the normal mode of operation and the emergency mode that is progressive.

The rupturing of a weld between the first diaphragm and the second diaphragm, or indeed the rupturing of a diaphragm as a result of an impact that leads to a crack propagating can lead to a similar scenario.

Consequently, the invention makes it possible to obtain an additional device that is relatively simple and that can assist the main motion transmission device during a normal mode of operation, while also taking over from the main device in an emergency mode.

The coupling means may also include one or more of the following characteristics.

Thus, each face with two angles of inclination extends radially from a cylinder of a segment referred to as the "bottom" segment towards a segment referred to as the "top" segment, each segment extending circumferentially from a first end towards a second end, and said first angle of inclination shifts the first end of each segment relative to the second end of the segment axially in a direction parallel to the axis of rotation.

The term "segment" then specifies the portion of a straight or curved line contained between a first end and a second end.

Furthermore, a diaphragm may be conical. The term "reference plane" then designates the plane containing the outer periphery of the diaphragm for connecting to the other diaphragm.

The bottom segment of a face having two angles of inclination is then situated at the interface between a cylinder and the face having two angles of inclination. In other words, a face having two angles of inclination extends radially relative to a cylinder from a bottom segment.

The top segment of a face having two angles of inclination represents the free end of the face having two angles of inclination.

Under such circumstances, for a line referred to as the "tangential" line passing via the first end of a segment and a point of the segment that is different from the first end, the first angle of inclination may optionally present a first angle lying in the range 15 degrees to 80 degrees, extending between the tangential line and the reference plane.

This range seeks to obtain the required wedging and a certain amount of centering force.

Furthermore, a face having two angles of inclination may be substantially plane and present a first angle of inclination that is constant, i.e. identical for all points of the bottom segment. Nevertheless, the first angle of inclination may vary, with two distinct points of the bottom segment possibly giving rise to two different tangential lines.

Likewise, each face having two angles of inclination extends radially from a cylinder of a bottom segment towards a top segment, each segment extending circumferentially from a first end towards a second end, said second angle of inclination shifting the bottom segment axially from the top segment in a direction parallel to the axis of rotation.

The term "second angle of inclination shifting the bottom segment axially from the top segment" means that at least one point of the top segment is not situated on the same radius as a point of the bottom segment.

In addition, the bottom segment is connected by a line referred to as the line "in elevation" to the top segment in a radial plane orthogonal to a reference plane containing the diaphragm of the member having the segments, and the second angle of inclination has a value lying in the range 15 degrees to 80 degrees between said line extending in elevation and said reference plane.

Furthermore, a face having two angles of inclination may be substantially plane presenting a second angle of inclination that is constant, i.e. identical for all points of the bottom segment. Nevertheless, the second angle of inclination may also vary, with two distinct points of the bottom segment possibly giving rise to two different tangential lines.

Furthermore, the first cylinder and the second cylinder may be coaxial.

An inside face of one cylinder thus faces an outside face of the other cylinder, the protrusions and the bearing faces extending between the inside face and the outside face. The coupling means are thus relatively compact. In addition, the first and second members are then correctly aligned relative to each other.

In particular, the second cylinder may be surrounded by the first cylinder.

Furthermore, the first member may have at least three protrusions.

At least three protrusions are used in order to optimize the centering of the first member relative to the second member during the emergency mode.

Furthermore, the protrusions may be uniformly distributed circumferentially on a circumference of the first cylinder.

This characteristic also optimizes the centering of the first member relative to the second member during the emergency mode.

In a first embodiment, each second bearing face is a portion of a single annular projection extending radially from the second cylinder, each blocking face being parallel to the annular projection.

Such an embodiment tends to facilitate fabrication of the coupling means.

Furthermore, the annular projection is optionally offset axially relative to the diaphragm of the second member.

In a second embodiment, the second member has a plurality of radial excrescences, each radial excrescence facing an abutment and including at least one second bearing face.

Whatever the embodiment, at least one protrusion may have two sliding faces that meet, possibly forming an edge. Such protrusions enable the invention to operate in both directions of rotation of the coupling means. Optionally, one of the sliding faces is closer to a first bearing face than the other sliding face, in a preferred direction of rotation.

Likewise, at least one protrusion may include two blocking faces that meet, optionally forming an edge, each blocking face being a face with two angles of inclination.

Furthermore, at least one abutment may include two first bearing faces that meet, optionally forming an edge.

In addition, the coupling means include a first reversible fastener device for fastening a protrusion to the first member, and/or a second reversible fastener device for fastening an abutment to the second member.

The additional device is then removable. Furthermore, the additional device may optionally be arranged on existing coupling means. In addition, fabrication of the members may be made easier.

Furthermore, in an embodiment the coupling means comprise:

the first member provided with a first hollow cylinder extending axially, a first base of a first diaphragm being secured to the first cylinder;

said second member provided with a second hollow cylinder extending axially, a second base of a second diaphragm being secured to the second cylinder, a second outer periphery of the second diaphragm being fastened to a first outer periphery of the first diaphragm;

a plurality of said protrusions secured to the first cylinder, each protrusion projecting into an internal space of the coupling means; and one abutment per protrusion, each abutment being secured to said second cylinder and projecting into said internal space, each protrusion being wedged against an abutment and a second bearing face of the second member in the event of a diaphragm rupturing.

In addition to coupling means, the invention provides a rotary mechanical transmission having a first rotary unit and a second rotary unit. The mechanical transmission then includes at least one coupling means of the invention.

Furthermore, the invention provides an aircraft, including such a mechanical transmission.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which:

FIG. 1 is a view showing an aircraft of the invention;

FIGS. 2 to 6 and 8 are views showing coupling means in a first embodiment;

FIGS. 9 to 15 are views showing the operation of the coupling means independently of the embodiment.

Figure 7:
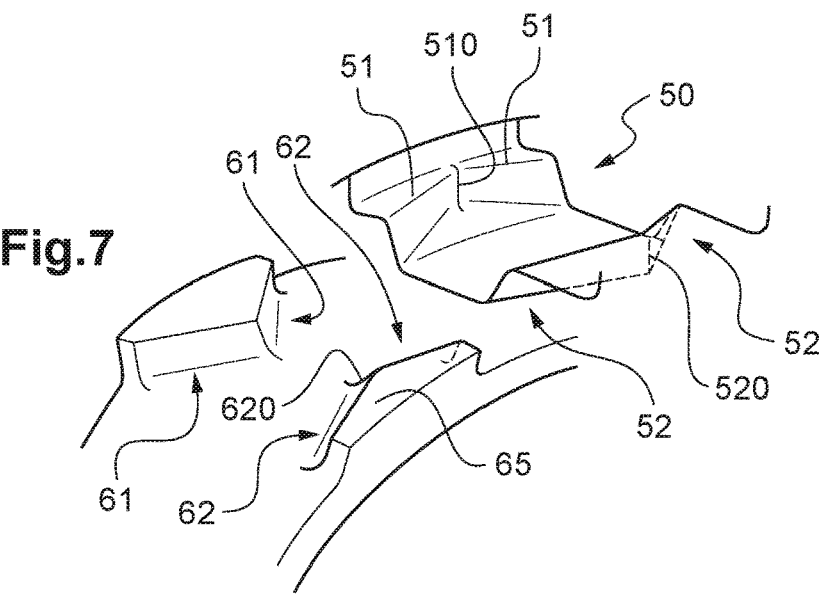
FIG. 7 is a three-dimensional view showing a second embodiment.

Elements present in more than one of the figures are given the same references in each of them.

DETAILED DESCRIPTION OF THE INVENTION

It should be observed that three mutually orthogonal directions X, Y, and Z are shown in some of the figures.

The first direction X is said to be longitudinal. The terms "longitudinal" and "axial" relate to any direction parallel to the first direction X.

The second direction Y is said to be transverse. Finally, the third direction Z is said to be in elevation. The term "radial" relates to any direction parallel to the second direction Y or to the third direction Z.

FIG. 1 shows an aircraft 1 having a mechanical transmission 5 suitable for transmitting torque and rotary motion. The other elements of the aircraft 1 are not shown for reasons of concession.

The mechanical transmission 5 has a first rotary unit 2 that is to be mechanically connected to a second rotary unit 3. Under such circumstances, the mechanical transmission 5 has at least one coupling means 10 interposed between the first rotary unit 2 and the second rotary unit 3.

Each coupling means 10 has the function of mechanically connecting the first rotary unit 2 to the second rotary unit 3 while allowing axial and angular shifting between these rotary units.

Under such circumstances, coupling means 10 of the invention comprise a first member 20 having a first diaphragm 22.

More precisely, the first member 20 as shown has a first cylinder 21 that is hollow. This first cylinder 21 extends longitudinally from a first distal end 21' to a first proximal end 21" along a first axis of symmetry AX of the first member 20.

A first annular base 23 of the first diaphragm 22 is then secured to the first proximal end 21". For example, this annular base is welded to the first proximal end 21".

The first diaphragm is then annular in shape, extending radially from its first annular base 23 to a first outer periphery 24.

Furthermore, the first distal end 21' of the first cylinder may include first fastener means (not shown in FIG. 1). The first fastener means then serve to secure the first member 20 to a rotary unit or to any other coupling means. In the example of FIG. 1, the first cylinder 21 is secured to the first rotary unit 2.

Furthermore, the coupling means 10 comprise a second member 30 provided with a second diaphragm 32.

The second member 30 shown comprises a hollow cylindrical body 35. This body 35 extends longitudinally from a distal termination 35' to a proximal termination 35" along a second axis of symmetry AX2 of the second member. In the absence of any misalignment, the coupling means performs rotary motion about an axis of revolution AX that coincides with the first axis of symmetry AX and with the second axis of symmetry AX2.

Furthermore, the proximal termination 35" of the body 35 may include second fastener means (not shown in FIG. 1). The second fastener means then serve to secure the second member 30 to a second rotary unit or to other coupling means. In the example of FIG. 1, the body 35 is secured to other coupling means.

In addition, a second annular base 33 of the second diaphragm 32 is secured to the proximal termination 35". For example, this annular base is welded to the proximal termination 35".

The second diaphragm is then annular in shape, extending radially from its second annular base 33 to a second outer periphery 34.

Under such circumstances, coupling means are provided with a fastener system for linking the first outer periphery 24 to the second outer periphery 34. This fastener system may include a bead of welding or indeed a plurality of bolts, for example.

The flexibility of the diaphragms enables the coupling mechanism to accommodate axial and/or angular shifting between the first member and the second member, and consequently between the two rotary units.

Furthermore, the second member 30 may include a second cylinder 31. The second cylinder extends the body 35 axially along the second axis of symmetry AX2 towards the first member. The second cylinder 31 thus extends axially from an end 31" secured to the body and to the base of the diaphragm towards a free end 31'.

The second cylinder 31 then extends inside the first cylinder 21, the second cylinder 31 and the first cylinder 21 being coaxial in the absence of misalignment.

In an alternative that is not shown, the first cylinder 21 extends inside the second cylinder 31. Under such circumstances, the second member comprises only the second diaphragm and the second cylinder, the second cylinder extending axially from the second diaphragm in order to be secured to a rotary unit or to other coupling means. In contrast, the first member has a body secured to the first diaphragm and to a rotary unit or to other coupling means, the first cylinder extending this body axially within the second cylinder.

In summary, in the alternative, the first cylinder is arranged inside the second cylinder or the first cylinder surrounds the second cylinder.

Independently of the alternative, a space referred to as the "internal" space INT lies radially between the first cylinder 21 and the second cylinder 31.

Furthermore, the coupling means 10 are provided with an additional device 40 suitable for mechanically connecting the first member 20 to the second member 30.

The additional device has a plurality of protrusions 50 arranged on the second member 30. Each protrusion 50 extends radially from the first cylinder 21 into the internal space INT.

Each protrusion 50 also extends axially along a direction 300 parallel to the first axis of symmetry AX1 of the first cylinder. In particular, each protrusion extends axially from a face referred to as the "sliding" face 51 towards a face referred to as the "blocking" face 52.

Furthermore, the additional device has a plurality of abutments 60 arranged on the second member 30. Each abutment 60 extends radially from the second cylinder 31 into the internal space INT.

Each abutment 60 also extends axially along a direction 301 parallel to the second axis of symmetry AX2 of the second cylinder. Each abutment 60 has a first bearing face 61. Each first bearing face 61 can then co-operate with a sliding face 51 of a protrusion. The first bearing face 61 then faces the sliding face 51 circumferentially and/or axially.

Furthermore, the second member 30 has at least one face referred to as a "second bearing" face 62 circumferentially and/or axially facing a blocking face 52 of at least one protrusion 50.

Furthermore, the sliding faces 51 of the protrusions 50 and the first bearing faces 61 of the abutments are faces with two angles of inclination, i.e. faces presenting two distinct slopes, for example. Optionally, the blocking faces 52 and the second bearing faces 62 are also faces with two angles of inclination.

Such faces with two angles of inclination present a first angle of inclination and a second angle of inclination BETA with a reference plane PREF of the diaphragm of the member having these faces. Such a reference plane PREF may represent the plane in which the outer peripheries 24, 34 of the diaphragms 22, 32 in question lie. The reference plane PREF of a member is also orthogonal to the axis of symmetry of the member.

With reference to FIG. 2, each face with two angles of inclination extends radially from a cylinder of a bottom segment 70 towards a top segment 80. The bottom segment of a face with two angles of inclination is situated at the interface between the face with two angles of inclination and the corresponding cylinder.

The second angle of inclination BETA then makes it possible for the bottom segment 70 to be shifted axially from the top segment 80 along a direction 300 parallel to the axis of rotation of the member in question. The second angle of inclination of a face having two angles of inclination is designed to tend to move a protrusion of the second cylinder radially away following relative rotation of the first member relative to the second member.

In addition, the bottom segment 70 may be connected by a line, referred to as the "elevation" line 84, to the top segment 80 in a radial plane P1 corresponding to the plane of the sheet of FIG. 2. This radial plane is orthogonal to the reference plane PREF containing the diaphragms 22, 32 of the members 20, 30 having these segments 70, 80. Under such circumstances, the second angle of inclination BETA reaches a value lying in the range 15 degrees to 80 degrees by extending between said elevation line and said reference plane.

With reference to FIG. 3, each segment 70, 80 also extends circumferentially from a first end 71, 82 to a second end 72, 82.

The first angle of inclination ALPHA then shifts the first end 71, 81 of each segment 70, 80 relative to the second end 72, 82 of the segment, axially in a direction 300 parallel to the axis of symmetry of the segment.

With reference to FIG. 4, the first end 71, 81 of a segment 70, 80 represents the point of the segment that is closest to the reference plane PREF of the angle of inclination 20, 30 having the segment 70, 80.

Under such circumstances, for each point 73 of a segment, a line referred to as the "tangential" line 74 passes via the first end 71, 81 of the segment at the point 73. For this point 73 of the segment, the first angle of inclination ALPHA reaches a value lying in the range 15 degrees to 80 degrees, extending between said tangential line 74 and the reference plane PREF.

Furthermore, and with reference to FIG. 5, the protrusions 50 of the first member are distributed circumferentially on a first annular wall 91 of the first cylinder. This first wall 91 faces a second annular wall 92 of the second cylinder. The protrusions are thus arranged on a circle.

More precisely, the first member has at least three protrusions 50, and in particular it has five protrusions 50 as shown in FIG. 5.

Furthermore, the protrusions 50 may be uniformly distributed around the circumference of the first cylinder 21. Two adjacent protrusions are thus separated by an angle equal to the quotient of an angle of 360 degrees divided by the number of protrusions, i.e. an angle of 72 degrees in FIG. 5.

Likewise, the abutments 60 of the first member 30 are circumferentially distributed on a second annular wall 92 of the second cylinder. The abutments 60 are thus arranged on a circle.

More precisely, the second member has at least five abutments 60 as shown in FIG. 5.

Furthermore, the abutments 60 may be uniformly distributed around the circumference of the second cylinder 31. Two adjacent abutments 60 are thus separated by an angle equal to the quotient of an angle of 360 degrees divided by the number of abutments 60, i.e. an angle of 72 degrees in FIG. 5.

Furthermore, and in a first embodiment as shown in FIG. 5 in particular, each second bearing face 62 represents a portion of a single annular projection 64.

This annular projection extends radially from said second cylinder 31 over the entire circumference of the second cylinder.

Under such circumstances, each blocking face 52 is parallel to the annular projection 64.

Optionally, the annular projection may be conical and may present the above-described second angle of inclination BETA.

In the variant of FIG. 5, the annular projection may be a portion of the second diaphragm 32.

In the variant of FIG. 6, the annular projection 64 is axially offset relative to the second diaphragm 32 of the second member 30. The annular projection is then in the form of a shoulder.

Independently of the embodiment, FIG. 6 shows coupling means comprising a first reversible fastener device 95 for fastening a protrusion 50 of the first member 20, such as screw fastener means, for example. Likewise, a second reversible fastener device 90 can fasten at least one abutment of the second member 30.

In the second embodiment shown in FIG. 7, the second member 30 has a plurality of radial excrescences 65. Each radial excrescence 65 faces an abutment 60, being axially offset relative to the abutment.

Under such circumstances, the radial excrescence has at least one second bearing face 62. FIG. 7 shows a radial excrescence having two second bearing faces 62.

Furthermore, and independently of the embodiment, at least one protrusion 50 may include two sliding faces 51 that are distinct and that meet and form an edge 510. Likewise, at least one protrusion 50 may have two distinct blocking faces 52 that meet and form an edge 520, each blocking face 52 being a face with two angles of inclination.

Consequently, at least one abutment 60 may have two distinct first bearing faces 61 that meet and form an edge 610. Where appropriate, a radial excrescence may have two second bearing faces 61.

Consequently, FIG. 7 shows coupling means in a second embodiment provided with abutments having two first bearing surfaces, protrusions having two sliding faces and two blocking faces, and radial excrescences having two second bearing faces.

Figure 8:
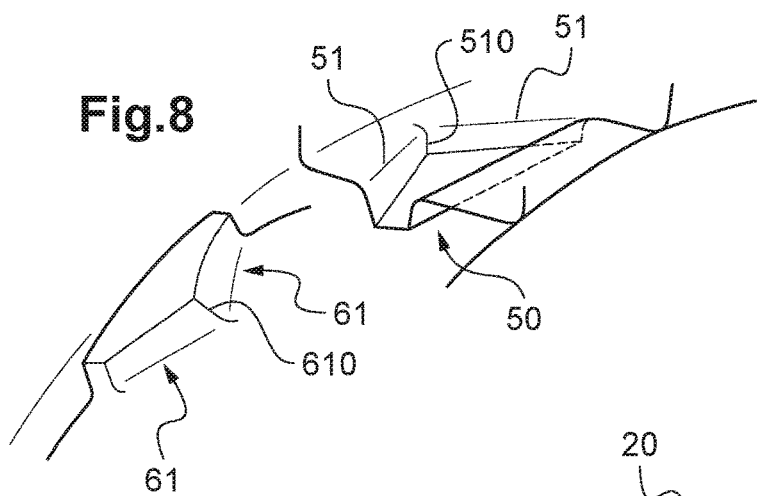

FIG. 8 shows coupling means in the first embodiment having abutments with two first bearing surfaces, one annular projection, and protrusions having two sliding faces and one blocking face.

FIGS. 9 to 14 show the operation of the invention.

With reference to FIG. 9, in a normal mode of operation, the protrusions 50 of the first inclination are not in contact with the second inclination.

In FIG. 9, each protrusion may be arranged axially between a first bearing face 61 and a second bearing face 62.

Nevertheless, a protrusion may be arranged in the gap lying circumferentially between two abutments 60.

Whatever the arrangement of the protrusions 50, first axial clearance 201 lies between each protrusion 50 and a first bearing face 61 of an abutment 60 in an axial direction 300 parallel to the axis of rotation AX3 of the first member 20 and of the second member 30. Likewise, second axial clearance 202 lies between each blocking face 52 of a protrusion and a second bearing face 62.

In addition, and with reference to FIG. 10, first radial clearance 101 lies between each protrusion 50 of the second member 30 in a direction passing via a radius R1 of the first cylinder 21. Furthermore, second radial clearance 102 lies between each bearing face of the first member 20 in a direction passing via a radius R2 of the second cylinder 31.

With reference to FIG. 11, in the event of a diaphragm rupturing or of the connection between the diaphragms rupturing, the protrusions 50 turn relative to the abutments 60 along arrow F1.

This relative movement may be progressive. Specifically, the diaphragms may deform before rupture proper occurs. Such deformation tends to lead to the protrusions moving relative to the abutments.

Under such circumstances, the sliding face of a protrusion comes into contact against the first bearing face 61.

With reference to FIG. 12, the first axial clearance 201 is then eliminated.

Furthermore, and with reference to FIG. 13, the first angle of inclination of the first bearing face 61 and of the sliding face tends to cause the protrusion to move axially along arrow F2 towards the second bearing face 62. The protrusion nevertheless remains in contact with the first bearing face 61.

With reference to FIG. 14, the first and second axial clearances 201 and 202 are then eliminated.

In contrast, the radial clearances remain.

Figure 15:
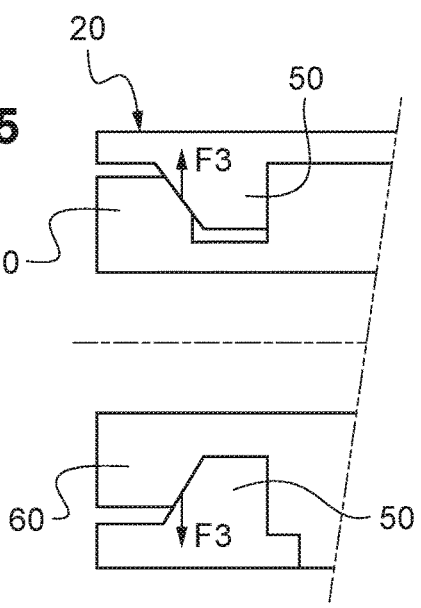

Specifically, and with reference to FIG. 15, the second angle of inclination tends to generate radial forces on the protrusions, these radial forces being represented by arrows F3.

Since the coupling means comprise a plurality of protrusions, the radial forces serve to center the first member relative to the second member while conserving the radial clearances.

Each protrusion of the first member is then wedged relative to the second member and enables torque and motion to be transmitted between the first member and the second member.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A coupling means provided with a first member suitable for being fastened to a first rotary unit and a second member suitable for being fastened to a second rotary unit, the first member being provided with a first diaphragm and the second member being provided with a second diaphragm that is secured to the first diaphragm in order to allow shifting between the first rotary unit and the second member, the coupling means including an additional torque transmission device for at least connecting together the first and second members in the event of at least one of the diaphragms or of a connection between the diaphragms rupturing;

wherein the additional device has at least one plurality of protrusions distributed circumferentially on a first cylinder of the first member and a second plurality of abutments distributed circumferentially on a second cylinder of the second member, each protrusion presenting at least one face with two angles of inclination referred to as a sliding face facing a face with two angles of inclination of an abutment referred to as a first bearing face, each protrusion presenting a face referred to as a blocking face facing a face referred to as a second bearing face of the second member;

wherein in the absence of rupture, first radial clearance lies between each protrusion of the first member and the second member in a direction passing via a radius (R1) of the first cylinder and second radial clearance lies between each bearing face of the second member and the first member in a direction passing via a radius (R2) of the second cylinder, first axial clearance lying between each protrusion and a respective first bearing face, and second axial clearance lying between each blocking face and a respective second bearing face in an axial direction parallel to an axis of rotation (AX3) of the first member and of the second member; and wherein each face with two angles of inclination presents a first angle of inclination (ALPHA) to enable a respective protrusion to be wedged between a respective first bearing face and a respective second bearing face by eliminating the axial clearances as a result of the protrusions turning relative to the bearing faces about the axis of rotation (AX3) in the event of rupture, each face with two angles of inclination presenting a second angle of inclination (BETA) for centering the first cylinder relative to the second cylinder following the relative turning.

2. A coupling means according to claim 1, wherein each face with two angles of inclination extends radially from a cylinder of a segment referred to as a bottom segment towards a segment referred to as a top segment, each segment extending circumferentially from a first end towards a second end, and the first angle of inclination (ALPHA) shifts the first end of each segment relative to the second end of the segment axially in a direction parallel to the axis of rotation.

3. A coupling means according to claim 1, wherein the first end of a segment represents the point of the segment closest to a reference plane (PREF) containing the diaphragm of the member having the segment, a line referred to as a tangential line passing via the first end and a point of the segment other than the first end, and the first angle of inclination (ALPHA) has a value lying in the range 15 degrees to 80 degrees, extending between the tangential line and the reference plane (PREF).

4. A coupling means according to claim 1, wherein each face having two angles of inclination extends radially from a cylinder of a segment referred to as a bottom segment towards a segment referred to as a top segment, each segment extending circumferentially from a first end towards a second end, the second angle of inclination (BETA) shifting the bottom segment axially from the top segment in a direction parallel to the axis of rotation.

5. A coupling means according to claim 4, wherein the bottom segment is connected by a line referred to as the line in elevation to the top segment in a radial plane (P1) orthogonal to a reference plane (PREF) containing the diaphragm of the member having the segments, and the second angle of inclination (BETA) has a value lying in the range 15 degrees to 80 degrees between the line extending in elevation and the reference plane.

6. A coupling means according to claim 1, wherein the first cylinder and the second cylinder are coaxial.

7. A coupling means according to claim 1, wherein the second cylinder is surrounded by the first cylinder.

8. A coupling means according to claim 1, wherein the first member has at least three protrusions.

9. A coupling means according to claim 1, wherein the protrusions are uniformly distributed circumferentially on a circumference of the first cylinder.

10. A coupling means according to claim 1, wherein each second bearing face is a portion of a single annular projection extending radially from the second cylinder, each blocking face being parallel to the annular projection.

11. A coupling means according to claim 10, wherein the annular projection is offset axially relative to the second diaphragm of the second member.

12. A coupling means according to claim 1, wherein the second member has a plurality of radial excrescences, each radial excrescence facing a respective abutment and including at least one respective second bearing face.

13. A coupling means according to claim 1, wherein at least one protrusion of the plurality of protrusions has two sliding faces.

14. A coupling means according to claim 1, wherein at least one protrusion of the plurality of protrusions has two blocking faces, each blocking face being a face with two angles of inclination.

15. A coupling means according to claim 1, wherein at least one abutment of the plurality of protrusions has two first bearing faces.

16. A coupling means according to claim 1, wherein the coupling means includes a first reversible fastener device for fastening a respective protrusion to the first member, and/or a second reversible fastener device for fastening a respective abutment to the second member.

17. A coupling means according to claim 1, wherein the coupling means comprises:

the first member provided with the first cylinder in the form of a first hollow cylinder extending axially, a first base of the first diaphragm being secured to the first cylinder;

the second member provided with the second cylinder in the form of a second hollow cylinder extending axially, a second base of the second diaphragm being secured to the second cylinder, a second outer periphery of the second diaphragm being fastened to a first outer periphery of the first diaphragm;

the plurality of the protrusions secured to the first cylinder, each protrusion projecting into an internal space (INT) of the coupling means; and one abutment of the plurality of abutments per protrusion, each abutment being secured to the second cylinder and projecting into the internal space (INT), each protrusion being wedged against a respective abutment and a respective second bearing face of the second member in the event of a diaphragm rupturing.

18. A rotary mechanical transmission having a first rotary unit and a second rotary unit, wherein the mechanical transmission includes at least one coupling means according to claim 1.

19. An aircraft, wherein the aircraft includes a mechanical transmission according to claim 18.

* * * * *